(12) United States Patent
Yan

(10) Patent No.: US 12,304,258 B1
(45) Date of Patent: May 20, 2025

(54) MULTIFUNCTIONAL BALL MOUNT WITH HIGH STRUCTURAL STRENGTH

(71) Applicant: Ningbo Siriust Metal Products Co. LTD, Ningbo (CN)

(72) Inventor: Shiwei Yan, Ningbo (CN)

(73) Assignee: Ningbo Siriust Metal Products Co. LTD, Ningbo (CN)

( * ) Notice: Subject to any disclaimer, the term of this patent is extended or adjusted under 35 U.S.C. 154(b) by 0 days.

(21) Appl. No.: 18/928,225

(22) Filed: Oct. 28, 2024

(30) Foreign Application Priority Data

Jul. 29, 2024 (CN) .......................... 202421804731.7

(51) Int. Cl.
*B60D 1/46* (2006.01)
*B60D 1/06* (2006.01)
*B60D 1/07* (2006.01)

(52) U.S. Cl.
CPC ................. *B60D 1/46* (2013.01); *B60D 1/06* (2013.01); *B60D 1/07* (2013.01)

(58) Field of Classification Search
CPC ............... B60D 1/46; B60D 1/06; B60D 1/07
See application file for complete search history.

(56) References Cited

U.S. PATENT DOCUMENTS

| | | | | |
|---|---|---|---|---|
| 3,865,406 A * | 2/1975 | Dutton | ..................... | B60D 1/46 280/490.1 |
| 6,726,237 B1 * | 4/2004 | Carrico | ..................... | B60D 1/46 280/490.1 |
| 7,204,501 B2 * | 4/2007 | Bang | ......................... | B60R 3/02 280/166 |
| 9,199,520 B2 * | 12/2015 | Weipert | ................... | B60D 1/46 |
| 10,857,846 B1 * | 12/2020 | Jacobs | ..................... | B60D 1/06 |
| 11,878,558 B2 * | 1/2024 | Hall | ........................ | B60D 1/247 |
| 2021/0370730 A1 * | 12/2021 | Pennington | .............. | B60D 1/54 |
| 2023/0120012 A1 * | 4/2023 | Russell | .................. | B60D 1/167 280/406.1 |

* cited by examiner

*Primary Examiner* — Valentin Neacsu
*Assistant Examiner* — Marlon A Arce
(74) *Attorney, Agent, or Firm* — Bayramoglu Law Offices LLC

(57) ABSTRACT

A multifunctional ball mount with a high structural strength includes a first mount body and a second mount body. The first mount body is configured to be connected to a towing vehicle, and the second mount body is slidably provided on the first mount body to adjust a height position of the second mount body. The second mount body is provided with a tow member. A positioning mechanism is provided between the first mount body and the second mount body. The second mount body is positioned with the first mount body through the positioning mechanism. The positioning mechanism includes a first positioning pin, a positioning through hole, and positioning grooves. The positioning through hole and the positioning grooves correspond to the first positioning pin. The positioning through hole is located on the second mount body. There are a plurality of positioning grooves located on the first mount body.

8 Claims, 7 Drawing Sheets

MULTIFUNCTIONAL BALL MOUNT WITH HIGH STRUCTURAL STRENGTH

CROSS REFERENCE TO THE RELATED APPLICATIONS

This application is based upon and claims priority to Chinese Patent Application No. 202421804731.7, filed on Jul. 29, 2024, the entire contents of which are incorporated herein by reference.

TECHNICAL FIELD

The present disclosure relates to the technical field of ball mounts, and in particular to a multifunctional ball mount with a high structural strength.

BACKGROUND

A ball mount is a towing tool used for towing vehicles. The ball mount generally includes a ball mount body and a tow ball connected to the ball mount body. The ball mount body is usually installed on the towing vehicle, while the tow ball is usually connected to the towed or malfunctioning vehicle. Some prior ball mounts include a first mount body and a second mount body that is slidable up and down relative to the first mount body. The first mount body is configured to be connected to the towing vehicle, and the second mount body is provided with a tow member (such as tow ball) connected to the towed vehicle. After the second mount body slides relative to the first mount body to the desired height position, one or more positioning pins penetrate the first mount body and the second mount body for positioning. The first mount body and the second mount body are provided with pin holes for inserting the positioning pins. The setting of the pin holes greatly reduces the structural strength of the first mount body and lowers the maximum towing tension to be sustained. As a result, the first mount body is prone to deformation, breakage, and other problems during towing.

In addition, for some prior ball mounts, the tow balls have a single size. In need of using other sizes of balls, it is necessary to disassemble the original ball and assemble a new large or small ball. Therefore, the prior ball mounts suffer from the problems of time-consuming and laborious ball replacement, as well as single functionality, resulting in poor user experience.

SUMMARY

In order to address at least one aspect of the above problems, the present disclosure provides a multifunctional ball mount with a high structural strength, including a first mount body and a second mount body, where the first mount body is configured to be connected to a towing vehicle, and the second mount body is slidably provided on the first mount body to adjust a height position of the second mount body; the second mount body is provided with a tow member; a positioning mechanism is provided between the first mount body and the second mount body; the second mount body is positioned with the first mount body through the positioning mechanism; the positioning mechanism includes a first positioning pin, a positioning through hole, and positioning grooves; the positioning through hole and the positioning grooves correspond to the first positioning pin; the positioning through hole is located on the second mount body; there are a plurality of positioning grooves located on the first mount body; the plurality of positioning grooves are distributed along a sliding direction of the second mount body; and when the first mount body and the second mount body are positioned through the positioning mechanism, the first positioning pin penetrates the positioning through hole along an axial direction of the first positioning pin, and a side wall of the first positioning pin is engaged with one of the positioning grooves for positioning. In the multifunctional ball mount with a high structural strength provided by the present disclosure, the positioning pin is engaged with the positioning groove on the first mount body for positioning, without the need for a pin hole on the first mount body. The present disclosure achieves a high structural strength, making the first mount body less prone to deformation, fracture, and other problems during towing, achieving a long service life.

Optionally, the first positioning pin is cylindrical, the positioning through hole is a circular through hole, and the positioning grooves are arc-shaped grooves.

Optionally, the first mount body includes a horizontal part and a vertical part; the horizontal part is configured to be connected to the towing vehicle; the second mount body is slidably provided on the vertical part; and the positioning grooves are located at a side end of the vertical part.

Optionally, the horizontal part and the vertical part are integrally formed; and a connection between the horizontal part and the vertical part is integrated with a reinforcement part.

Optionally, the vertical part is provided with a protruding strip; the protruding strip extends along the sliding direction of the second mount body; and the positioning grooves are provided on the protruding strip.

Optionally, the second mount body is provided with a sliding groove corresponding to the vertical part; the second mount body is provided with a limit groove corresponding to the protruding strip; and the protruding strip is limited in the limit groove.

Optionally, the tow member is located at a side end of the second mount body; and the limit groove is located at an end of the second mount body away from the tow member.

Optionally, the second mount body slides vertically.

Optionally, one end of the first positioning pin is provided with a limit post, and a limit lock head is detachably provided on the other end of the first positioning pin.

Optionally, a rotating part is rotatably provided on the second mount body; the tow member is connected to the rotating part; the second mount body is provided with a second positioning pin for positioning the rotating part; the second mount body is further provided with a first positioning hole corresponding to the second positioning pin; the rotating part is provided with a second positioning hole corresponding to the second positioning pin; the tow member includes a first tow member and a second tow member; the first tow member is formed by a first tow ball, a first tow ring, or a first tow hook; and the second tow member is formed by a second tow ball, a second tow ring, or a second tow hook.

Optionally, a lower part of the first mount body is provided with a first low-level positioning hole, and the second mount body is provided with a second low-level positioning hole; the first low-level positioning hole and the second low-level positioning hole correspond to the first positioning pin; and when the second mount body is adjusted to a low level, the first positioning pin penetrates the first low-level positioning hole and the second low-level positioning hole for positioning.

Compared with the prior art, the multifunctional ball mount with a high structural strength provided by the present disclosure has the following advantages. The positioning pin is engaged with the positioning groove on the first mount body for positioning, without the need for a pin hole on the first mount body. The present disclosure achieves a high structural strength, making the first mount body less prone to deformation, fracture, and other problems during towing, achieving a long service life. The side wall of the first positioning pin is an arc-shaped side wall. When the positioning groove is engaged with the first positioning pin, arc-shaped surfaces abut against each other to achieve positioning, with uniform force, stable engagement, secure positioning, and reliable use. A connection between the horizontal part and the vertical part is integrated with a reinforcement part, which increases the structural strength of the connection between the horizontal part and the vertical part, making it less prone to breakage. The second mount body is provided with a sliding groove corresponding to the vertical part. The vertical part slides smoothly and steadily along a height direction in the sliding groove. The limit lock head is provided with a keyhole. During a disassembling process, by simply unlocking with a key, the limit lock head and the first positioning pin are removed. The operation is safe, reliable, and easy. The quantity and specific type of the tow members are set according to the needs, suiting a wide range of applications and meeting different towing needs. When the second mount body is adjusted to a low level, the first positioning pin penetrates the first low-level positioning hole and the second low-level positioning hole for positioning, meeting the needs of low-level towing and suiting a wide range of usage scenarios.

REFERENCE NUMERALS

Figure 1:
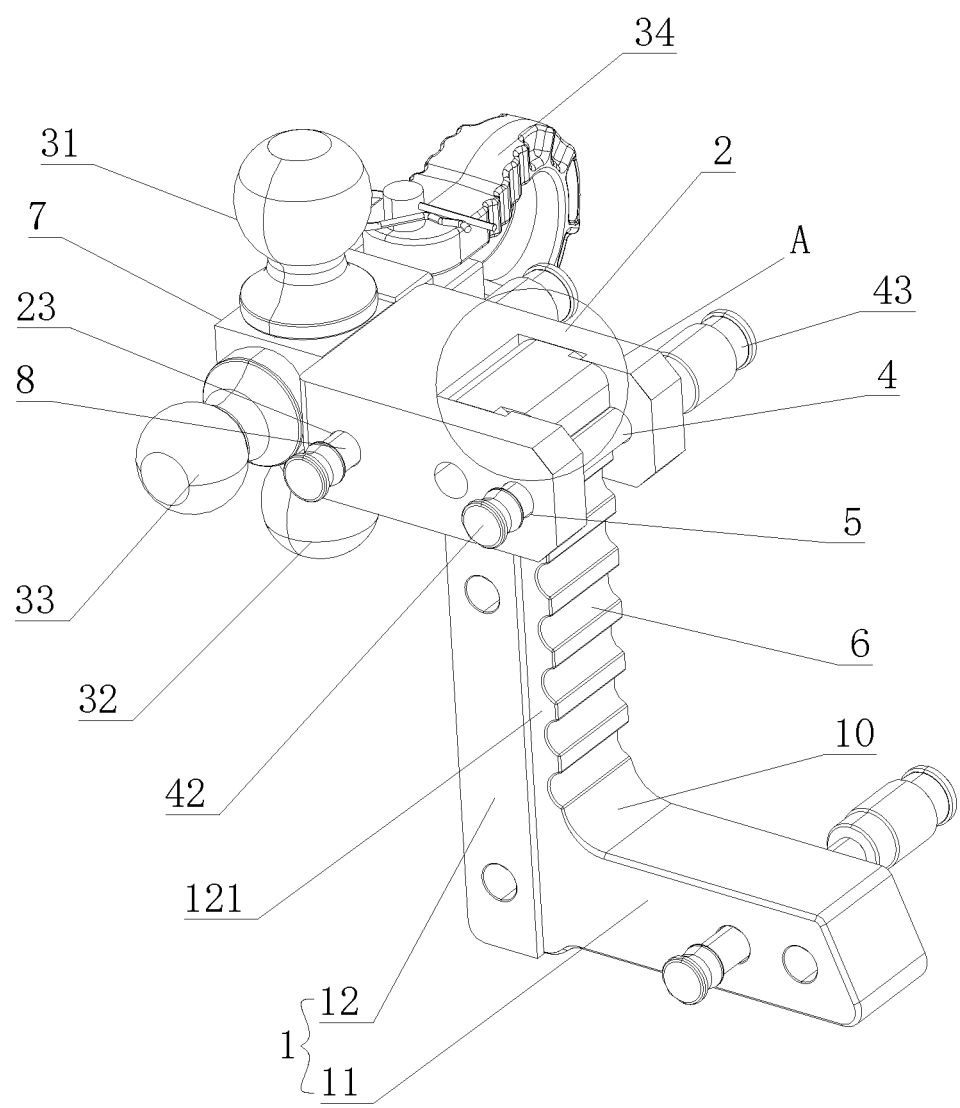
FIG. 1 is a three-dimensional diagram of a multifunctional ball mount with a high structural strength according to a first embodiment of the present disclosure.

1. first mount body; 11. horizontal part; 12. vertical part; 121. protruding strip; 2. second mount body; 21. sliding groove; 22. limit groove; 23. first positioning hole; 24. second positioning hole; 25. second low-level positioning hole; 3. tow member; 31. first tow member; 32. second tow member; 33. third tow member; 34. fourth tow member; 4. first positioning pin; 41. side wall; 42. limit post; 43. limit lock head; 431. keyhole; 5. positioning through hole; 6. positioning groove; 7. rotating part; 8. second positioning pin; 10. reinforcement part; 13. first low-level positioning hole; and 14. machining process hole.

DETAILED DESCRIPTION OF THE EMBODIMENTS

To make the above objectives, features, and advantages of the present disclosure clearer and more comprehensible, specific embodiments of the present disclosure will be described in detail below with reference to the drawings.

In the description of the present disclosure, it should be understood that orientation or position relationships indicated by terms such as "upper" and "lower" are orientation or position relationships of the product in normal use.

In addition, the terms such as "first" and "second" are used only for descriptive purposes, and should not be construed as indicating or implying relative importance or implying the number of indicated technical features. Therefore, features defined by "first" and "second" may explicitly or implicitly include at least one of the features.

First Embodiment

As shown in FIGS. 1 to 5, the first embodiment of the present disclosure provides a multifunctional ball mount with a high structural strength, including first mount body 1 and second mount body 2. The first mount body 1 and the second mount body 2 are both made of a metal material. The first mount body 1 is configured to be connected to a towing vehicle, and the second mount body 2 is slidably provided on the first mount body 1 to adjust a height position of the second mount body 2. The second mount body 2 is provided with tow member 3 for connecting a towed vehicle. A positioning mechanism is provided between the first mount body 1 and the second mount body 2. The second mount body 2 is positioned with the first mount body 1 through the positioning mechanism. The positioning mechanism includes first positioning pin 4, positioning through hole 5, and positioning grooves 6. The positioning through hole 5 and the positioning grooves 6 correspond to the first positioning pin 4. The positioning through hole 5 is located on the second mount body 2. There are a plurality of positioning grooves 6 located on the first mount body 1. The plurality of positioning grooves 6 are distributed along a sliding direction of the second mount body 2. One of the corresponding positioning grooves 6 is selected to engage with the first positioning pin 4 for positioning according to a requirement, thereby positioning the second mount body 2 at a desired height position. The design achieves an adjustable height of the tow member and suits different vehicle models. When the first mount body 1 and the second mount body 2 are positioned through the positioning mechanism, the first positioning pin 4 penetrates the positioning through hole 5 along an axial direction of the first positioning pin 4, and side wall 41 of the first positioning pin 4 is engaged with one of the positioning grooves 6 for positioning. In the multifunctional ball mount with a high structural strength provided by the present disclosure, the positioning pin is engaged with the positioning groove on the first mount body for positioning, without the need for a pin hole on the first mount body. The present disclosure achieves a high structural strength, making the first mount body less prone to deformation, fracture, and other problems during towing, achieving a long service life.

Figure 2:
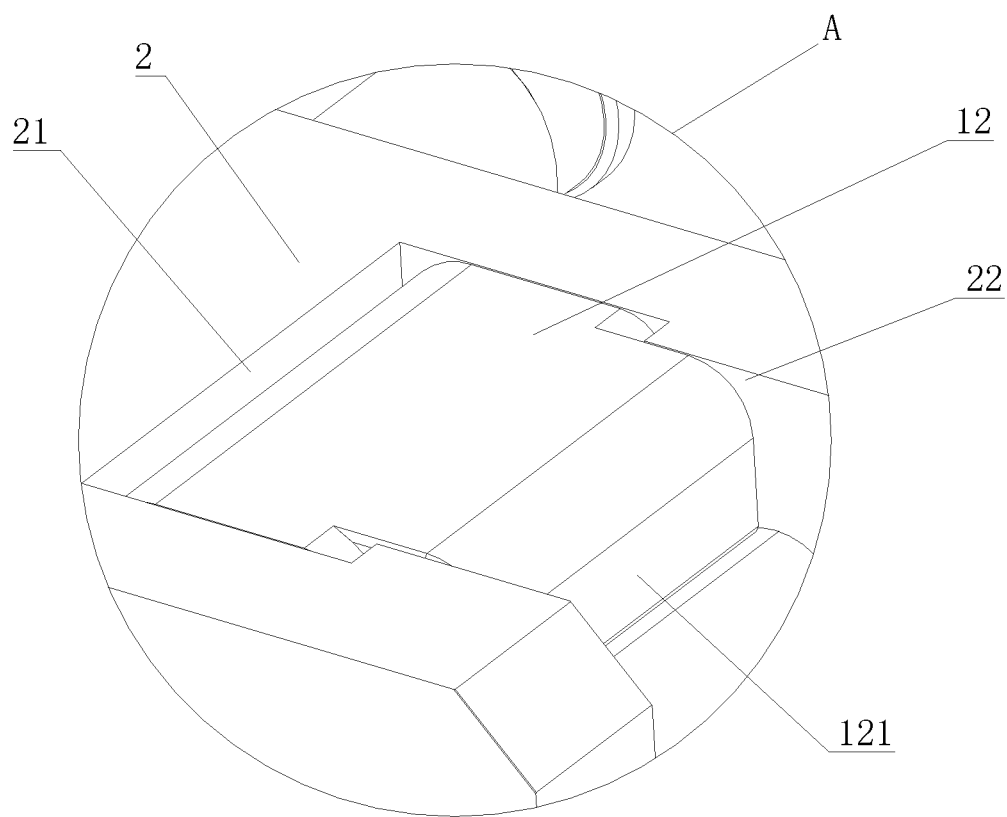
FIG. 2 is a detail of A shown in FIG. 1.
Figure 3:
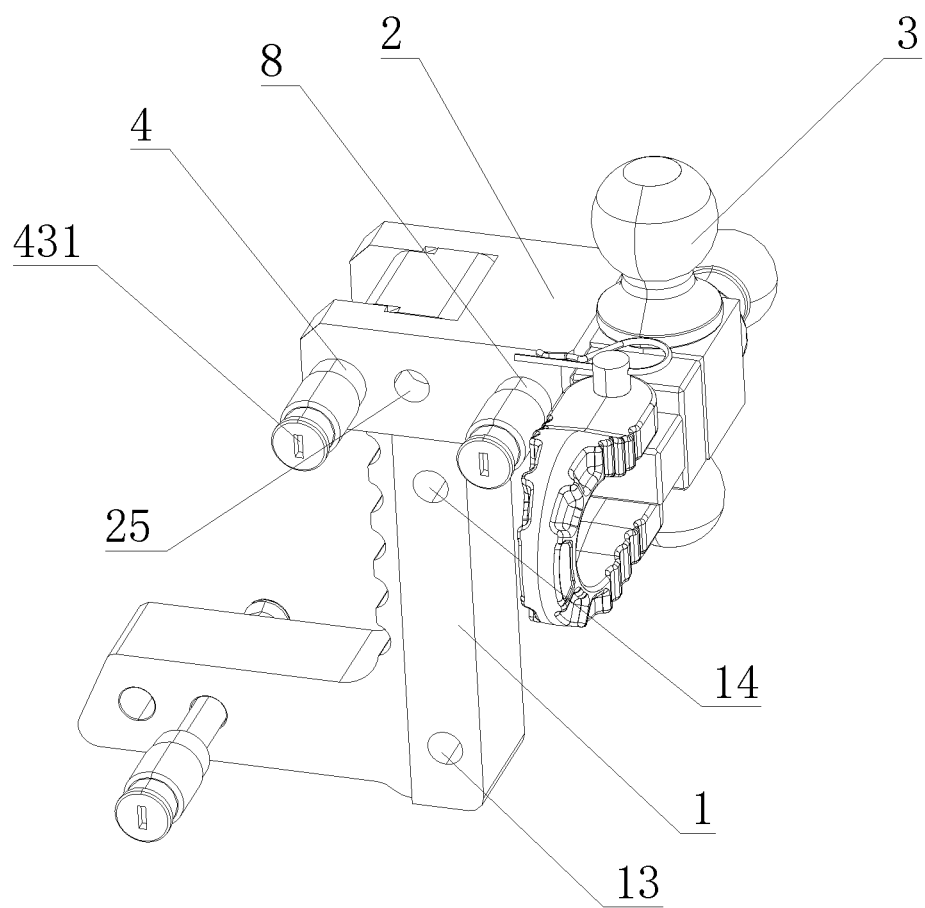
FIG. 3 is a structural diagram of the multifunctional ball mount with a high structural strength according to the first embodiment of the present disclosure.
Figure 4:
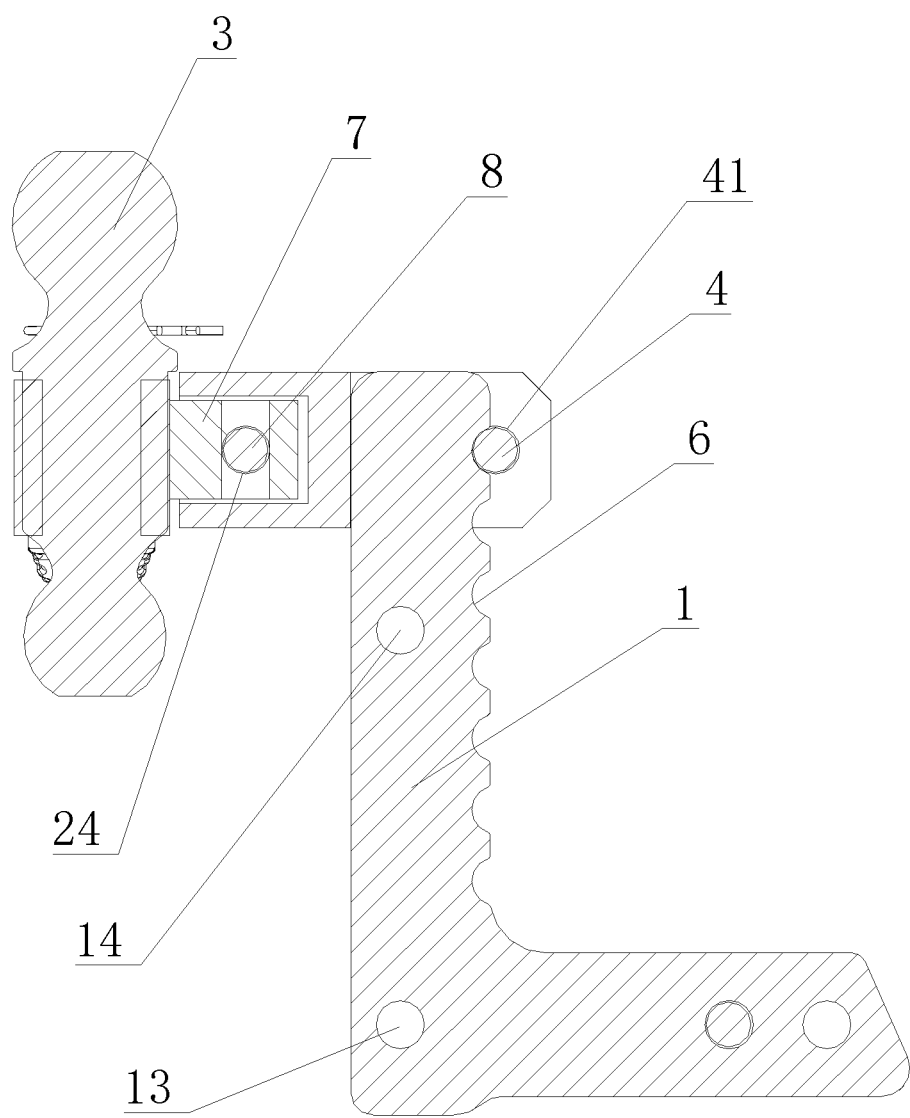
FIG. 4 is a sectional view of the multifunctional ball mount with a high structural strength according to the first embodiment of the present disclosure.
Figure 5:
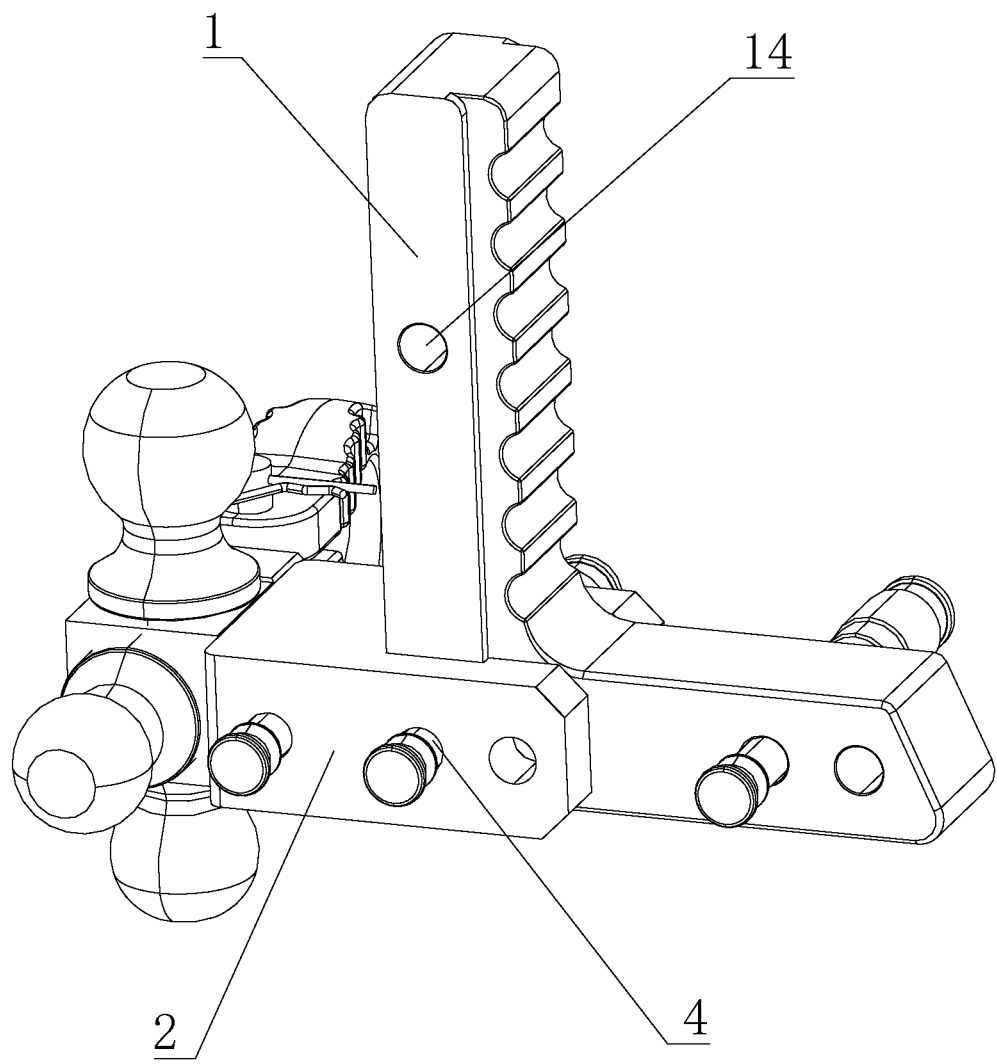
FIG. 5 is a structural diagram of a second mount body, adjusted to a low level, of the multifunctional ball mount with a high structural strength according to the first embodiment of the present disclosure.

As shown in FIGS. 1, 2, and 4, the first positioning pin 4 is cylindrical, the positioning through hole 5 is a circular through hole, the positioning grooves 6 are arc-shaped grooves, and the side wall 41 of the first positioning pin 4 is an arc-shaped side wall. When the positioning groove 6 is engaged with the first positioning pin 4, arc-shaped surfaces abut against each other to achieve positioning, with uniform force, stable engagement, secure positioning, and reliable use. The first mount body 1 includes horizontal part 11 and vertical part 12. The horizontal part 11 and the vertical part 12 are perpendicular or approximately perpendicular, so the first mount body 1 is L-shaped. The horizontal part 11 is configured to be connected to the towing vehicle. The second mount body 2 is slidably provided on the vertical part 12. The positioning grooves 6 are located at a side end of the vertical part 12. Specifically, the positioning grooves 6 are located at a side of the vertical part 12 close to the horizontal part 11. The horizontal part 11 and the vertical part 12 are integrally formed. A connection between the horizontal part 11 and the vertical part 12 is integrated with reinforcement part 10, which increases the structural strength of the connection between the horizontal part 11 and the vertical part 12, making it less prone to breakage. The vertical part 12 is provided with protruding strip 121. The protruding strip 121 extends along the sliding direction of the second mount body 2. The positioning grooves 6 are provided on the protruding strip 121. The structural design is reasonable.

As shown in FIGS. 1 to 4, the second mount body 2 is provided with sliding groove 21 corresponding to the vertical part 12. The vertical part 12 slides smoothly and steadily along a height direction in the sliding groove 21. The second mount body 2 is provided with limit groove 22 corresponding to the protruding strip 121. The protruding strip 121 is limited in the limit groove 22 to ensure smooth sliding. The tow member 3 is located at a side end of the second mount body 2. The limit groove 22 is located at an end of the second mount body 2 away from the tow member 3. The structural design is reasonable. The second mount body 2 slides vertically. As the second mount body 2 slides, the height of the tow member 3 is adjusted.

As shown in FIGS. 1, 3, 4, and 5, one end of the first positioning pin 4 is provided with limit post 42, and limit lock head 43 is detachably provided on the other end of the first positioning pin 4. During a mounting process, the second mount body 2 first slides to the corresponding height, and then the end of the first positioning pin 4 away from the limit post 42 is inserted into the positioning through hole 5. At this point, the side wall of the first positioning pin 4 is engaged with one of the positioning grooves 6 for positioning. Then, the limit lock head 43 is fitted and locked with the end of the first positioning pin 4 away from the limit post 42. The limit lock head 43 is provided with keyhole 431. During a disassembling process, by simply unlocking with a key, the limit lock head 43 and the first positioning pin 4 are removed. The operation is safe, reliable, and easy. Rotating part 7 is rotatably provided on the second mount body 2. The tow member 3 is connected to the rotating part 7. The second mount body 2 is provided with second positioning pin 8 for positioning the rotating part 7. The second mount body 2 is further provided with first positioning hole 23 corresponding to the second positioning pin 8. The rotating part 7 is provided with second positioning holes 24 corresponding to the second positioning pin 8. There are two second positioning holes 24 arranged vertically, allowing the second positioning pin 8 to be inserted for positioning for every 900 rotation of the rotating part 7. The tow member 3 includes first tow member 31 and second tow member 32. There are at least two tow member options for selection. In the first embodiment, the tow member 3 further includes third tow member 33 and fourth tow member 34. The four tow members are distributed in a circular pattern with equal spacing. The first tow member 31 is formed by a first tow ball, a first tow ring, or a first tow hook. The second tow member 32 is formed by a second tow ball, a second tow ring, or a second tow hook. The third tow member 33 is formed by a third tow ball, a third tow ring, or a third tow hook. The fourth tow member 34 is formed by a fourth tow ball, a fourth tow ring, or a fourth tow hook. In the first embodiment, the first tow member 31 is formed by the first tow ball, the second tow member 32 is formed by the second tow ball, and the third tow member 33 is formed by the third tow ball. The diameters of the first tow ball, the second tow ball, and the third tow ball are different to meet different towing needs. The fourth tow member 34 is formed by a tow ring. The quantity and specific type of the tow members are set according to the needs, with a wide range of applications. A lower part of the first mount body 1 is provided with first low-level positioning hole 13, and the second mount body 2 is provided with second low-level positioning hole 25. The first low-level positioning hole 13 and the second low-level positioning hole 25 correspond to the first positioning pin 4. When the second mount body 2 is adjusted to a low level, the first positioning pin 4 penetrates the first low-level positioning hole 13 and the second low-level positioning hole 25 for positioning, meeting the needs of low-level towing and suiting a wide range of usage scenarios. The first mount body 1 is provided with machining process hole 14 for positioning during machining. For example, during processing, the positioning pin of external processing equipment falls into the machining process hole 14 for positioning. The design is easy to process and manufacture, with smooth processing and improved yield rate.

Second Embodiment

Figure 6:
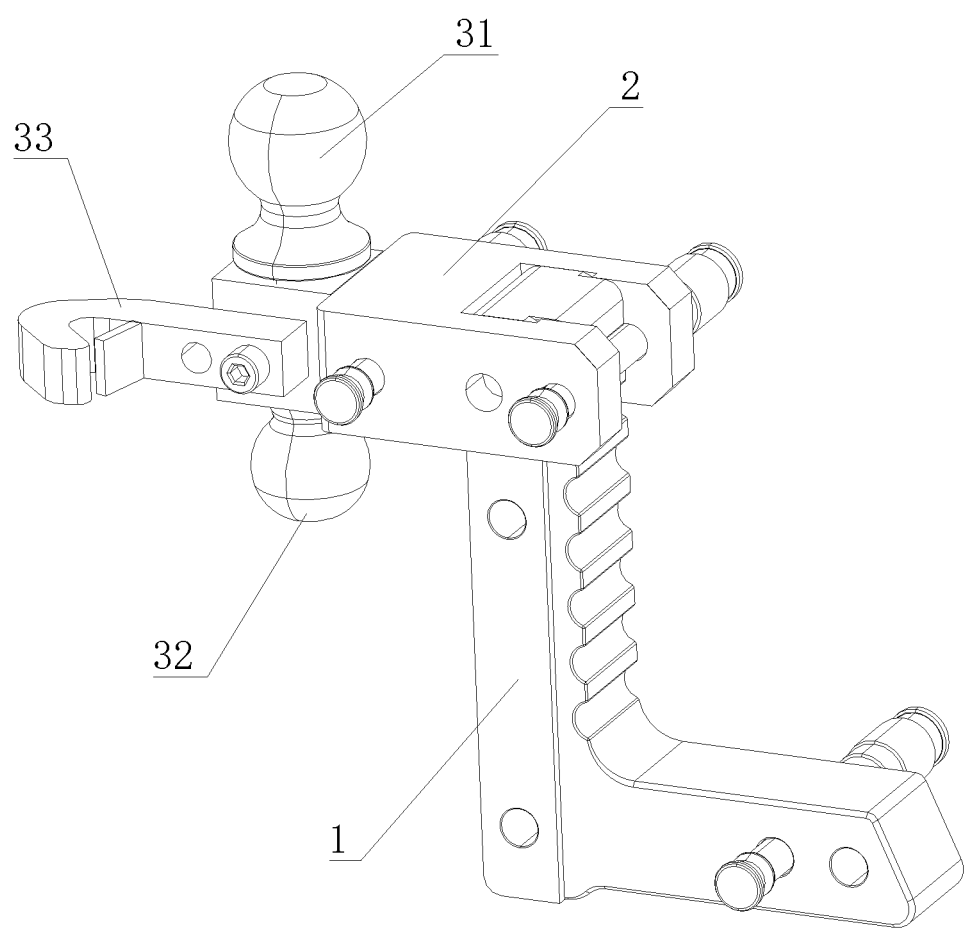
FIG. 6 is a structural diagram of a multifunctional ball mount with a high structural strength according to a second embodiment of the present disclosure.

As shown in FIG. 6, the difference between the second embodiment and the first embodiment is that the third tow member 33 is a tow hook and no fourth tow member is provided, meeting different tow requirements.

Third Embodiment

Figure 7:
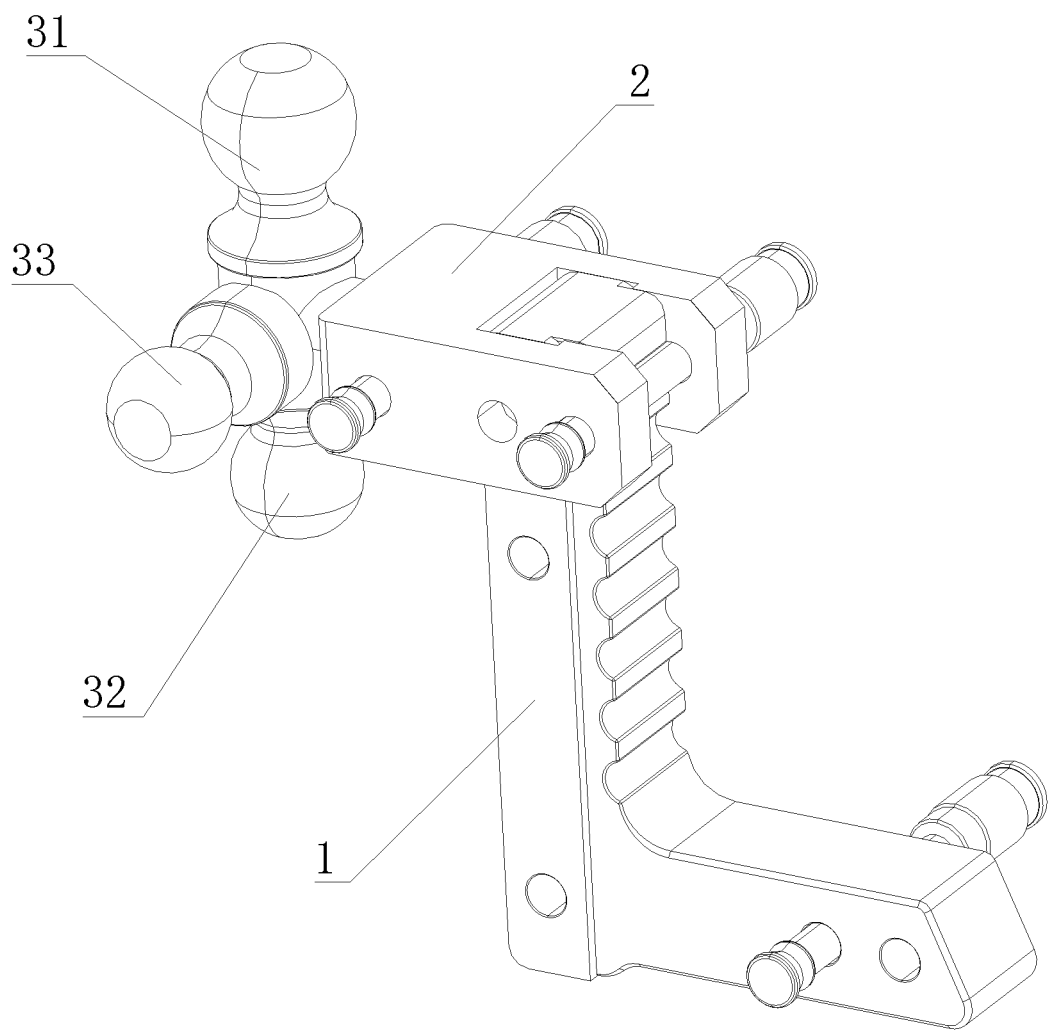
FIG. 7 is a structural diagram of a multifunctional ball mount with a high structural strength according to a third embodiment of the present disclosure.

As shown in FIG. 7, the difference between the third embodiment and the first embodiment is that a fourth tow member 34 is not provided, which saves costs.

In the multifunctional ball mount with a high structural strength provided by the present disclosure, the positioning pin is engaged with the positioning groove on the first mount body for positioning, without the need for a pin hole on the first mount body. The present disclosure achieves a high structural strength, making the first mount body less prone to deformation, fracture, and other problems during towing, achieving a long service life. The side wall of the first positioning pin is an arc-shaped side wall. When the positioning groove is engaged with the first positioning pin, arc-shaped surfaces abut against each other to achieve positioning, with uniform force, stable engagement, secure positioning, and reliable use. A connection between the horizontal part and the vertical part is integrated with a reinforcement part, which increases the structural strength of the connection between the horizontal part and the vertical part, making it less prone to breakage. The second mount body is provided with a sliding groove corresponding to the vertical part. The vertical part slides smoothly and steadily along a height direction in the sliding groove. The limit lock head is provided with a keyhole. During a disassembling process, by simply unlocking with a key, the limit lock head and the first positioning pin are removed. The operation is safe, reliable, and easy. The quantity and specific type of the tow members are set according to the needs, suiting a wide range of applications and meeting different towing needs. When the second mount body is adjusted to a low level, the first positioning pin penetrates the first low-level positioning hole and the second low-level positioning hole for positioning, meeting the needs of low-level towing and suiting a wide range of usage scenarios.

The above described are only preferred embodiments of the present disclosure. It should be noted that those skilled in the art can make several improvements and modifications without departing from the technical principles of the present disclosure, and such improvements and modifications should also be construed as falling within the protection scope of the present disclosure.

What is claimed is:

1. A multifunctional ball mount with a high structural strength, comprising a first mount body and a second mount body, wherein the first mount body is configured to be connected to a towing vehicle, and the second mount body is slidably provided on the first mount body to adjust a height position of the second mount body; the second mount body is provided with a tow member; a positioning mechanism is provided between the first mount body and the second mount body; the second mount body is positioned with the first mount body through the positioning mechanism; the positioning mechanism comprises a first positioning pin, and a plurality of positioning grooves; a positioning through hole and the plurality of positioning grooves correspond to the first positioning pin; the positioning through hole is located on the second mount body; the plurality of positioning grooves are located on the first mount body; the plurality of positioning grooves are distributed along a sliding direction of the second mount body; and when the first mount body and the second mount body are positioned through the positioning mechanism, the first positioning pin penetrates the positioning through hole along an axial direction of the first positioning pin, and a side wall of the first positioning pin is engaged with a positioning groove of the plurality of positioning grooves for positioning, wherein the first mount body comprises a horizontal part and a vertical part; the horizontal part is configured to be connected to the towing vehicle; the second mount body is slidably provided on the vertical part; and the plurality of positioning grooves are located at a side end of the vertical part, wherein the horizontal part and the vertical part are integrally formed; and a connection between the horizontal part and the vertical part is integrated with a reinforcement part, and wherein the vertical part is provided with a protruding strip; the protruding strip extends along the sliding direction of the second mount body; and the plurality of positioning grooves are provided on the protruding strip.

2. The multifunctional ball mount with the high structural strength according to claim 1, wherein the first positioning pin is cylindrical, the positioning through hole is a circular through hole, and the plurality of positioning grooves are arc-shaped grooves.

3. The multifunctional ball mount with the high structural strength according to claim 1, wherein the second mount body is provided with a sliding groove corresponding to the vertical part; the second mount body is provided with a limit groove corresponding to the protruding strip; and the protruding strip is limited in the limit groove.

4. The multifunctional ball mount with the high structural strength according to claim 3, wherein the tow member is located at a side end of the second mount body; and the limit groove is located at an end of the second mount body away from the tow member.

5. The multifunctional ball mount with the high structural strength according to claim 1, wherein the second mount body slides vertically.

6. The multifunctional ball mount with the high structural strength according to claim 1, wherein a first end of the first positioning pin is provided with a limit post, and a limit lock head is detachably provided on a second end of the first positioning pin.

7. The multifunctional ball mount with the high structural strength according to claim 1, wherein a rotating part is rotatably provided on the second mount body; the tow member is connected to the rotating part; the second mount body is provided with a second positioning pin for positioning the rotating part; the second mount body is further provided with a first positioning hole corresponding to the second positioning pin; the rotating part is provided with a second positioning hole corresponding to the second positioning pin; the tow member comprises a first tow member and a second tow member; the first tow member is formed by a first tow ball, a first tow ring, or a first tow hook; and the second tow member is formed by a second tow ball, a second tow ring, or a second tow hook.

8. The multifunctional ball mount with the high structural strength according to claim 1, wherein a lower part of the first mount body is provided with a first low-level positioning hole, and the second mount body is provided with a second low-level positioning hole; the first low-level positioning hole and the second low-level positioning hole correspond to the first positioning pin; and when the second mount body is adjusted to a low level, the first positioning pin penetrates the first low-level positioning hole and the second low-level positioning hole for positioning.

* * * * *